United States Patent [19]
Pfaff, Jr.

[11] 3,796,851
[45] Mar. 12, 1974

[54] APPARATUS FOR MAKING CYLINDRICAL DIES

[75] Inventor: Alan R. Pfaff, Jr., Orchard Lake, Mich.

[73] Assignee: Bernal Rotary Systems, Inc., Troy, Mich.

[22] Filed: July 28, 1972

[21] Appl. No.: 276,085

Related U.S. Application Data

[60] Continuation of Ser. No. 69,881, Sept. 4, 1970, abandoned, which is a division of Ser. No. 752,612, Aug. 14, 1968, Pat. No. 3,550,479.

[52] U.S. Cl. ............................ 219/69 V, 219/69 M
[51] Int. Cl. ................................................ B23p 1/12
[58] Field of Search ........................ 219/69 M, 69 V

[56] References Cited
UNITED STATES PATENTS
2,385,665 9/1945 Warwick ........................... 219/69 V
3,660,628 5/1972 Celovsky ........................... 219/69 V FOREIGN PATENTS OR APPLICATIONS
1,472,130 1/1967 France ............................ 219/69 M
1,224,109 2/1960 France ............................ 219/69 V

*Primary Examiner*—J. V. Truhe
*Assistant Examiner*—Hugh D. Jaeger

[57] ABSTRACT

A cylindrical cutting die is made by mounting a line drawing of the pattern to be cut on a copy cylinder supported on the table of a milling machine for rotary movement in unison with a negative cylinder. A scanning device senses the pattern on the copy cylinder and coordinates rotary movement of the cylinders and linear movement of the machine table to cause a cutter mounted on the machine spindle to form a grooved reproduction of the pattern on the negative cylinder, which is then used in an electrical discharge machine, equipped with a fixture for rotatably supporting the negative cylinder on the machine head in axially parallel relation with a die blank cylinder in the machine tank and for rotating the cylinders at equal rotational speed, to cause a raised cutting pattern to be machined on the die cylinder corresponding to the grooved reproduction on the negative cylinder.

5 Claims, 7 Drawing Figures

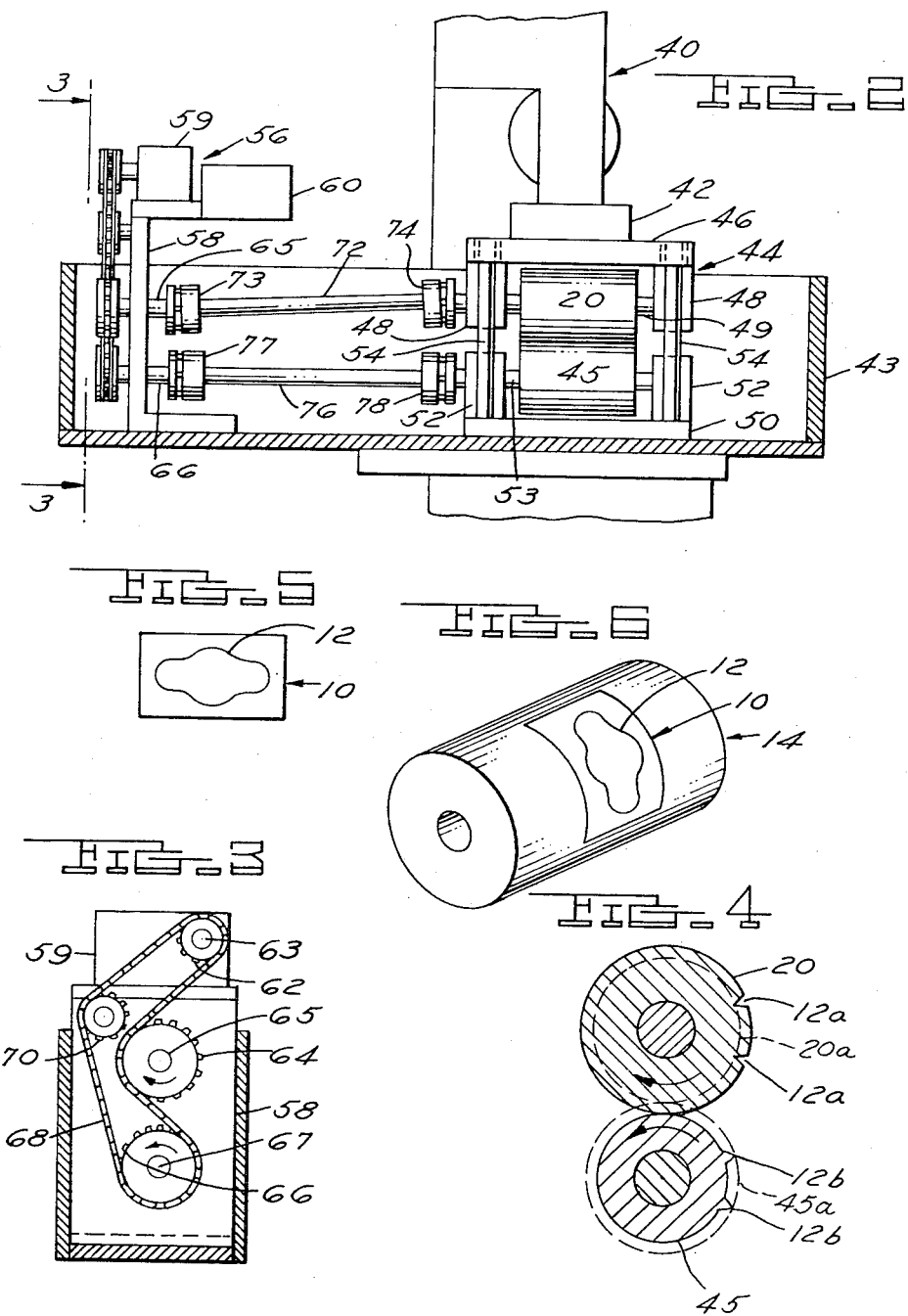

APPARATUS FOR MAKING CYLINDRICAL DIES

This application is a continuation of abandoned application Ser. No. 69,881, filed Sept. 4, 1970, which was a division of Ser. No. 752,612, filed Aug. 14, 1968, U.S. Pat. No. 3,550,479.

BACKGROUND OF THE INVENTION

1. Field of the Invention

This invention relates to an improved method and apparatus for making a cylindrical cutting die from a precision layout of the desired cutting pattern, which may for example be for some type of gasket having a non-geometric shape.

2. Description of the Prior Art

Most cutting dies are of the plate type, the cutting operation being performed by reciprocating die movement. The rolling cutting action of a cylindrical die has obvious advantages over the stamping action of a plate type die, but it has not been practically possible to produce the cylindrical form of die with the required degree of precision and hardness, particularly where the cutting edge pattern is a non-geometrical one.

SUMMARY OF THE INVENTION

The invention provides apparatus for performing a machining operation to form a cutting configuration on a die cylinder from a negative cylinder having an outside diameter and a negative reproduction of the cutting configuration formed therein and extending inwardly of the outside diameter to a root diameter, and wherein the die cylinder has a cutting diameter which is less than the outside diameter of the negative cylinder by a dimension at least two times the depth of the cutting configuration formed therein. The apparatus further comprises an electrical discharge machine having a tank and a head portion movable relative thereto, the machine being provided with head mounted means and tank mounted means for rotatably supporting said cylinders in axially parallel relation during relative movement between the head portion and the tank; and, driving means for continuously rotating the cylinders in opposite directions at equal peripheral speeds of the root diameter of the negative cylinder and the cutting diameter of the die cylinder during the machining operation.

Preferably, the driving means includes a motor, a drive shaft coupled to the negative cylinder, a second drive shaft coupled to the die cylinder, and a driving connection from the motor to each of said shafts, at least one of the drive shafts including a flexible coupling permitting relative movement between the cylinders in a direction perpendicular to the axes thereof.

Electrical discharge machining (EDM) permits the use of a hardened steel die cylinder and the apparatus enables a precise reproduction of the cutting configuration to be formed thereon.

Other features and advantages of the invention will appear from the description to follow of the method and apparatus illustrated in the accompanying drawing.

DESCRIPTION OF THE DRAWING

FIG. 2 is a schematic elevation of the tank and head of an (EDM) electrical discharge machine showing a fixture used for machining a cylindrical work piece from the negative electrode cylinder;

FIG. 3 is an elevation taken as indicated by the line 3—3 of FIG. 2;

FIG. 4 is an enlarged sectional elevation through the negative electrode and work piece cylinders in the apparatus of FIG. 3;

FIG. 5 is a representative master layout;

FIG. 6 illustrates a copy cylinder with the layout of FIG. 6 mounted on the periphery thereof; and, FIG. 7 illustrates the steps which may be employed in making the master layout of FIG. 5.

DESCRIPTION OF THE PREFERRED EMBODIMENTS

The drawings illustrate the application of the invention to the manufacture of a cylindrical cutting die. FIG. 5 shows the first step involved in this manufacture — the preparation of a precision line layout of the desired shape or pattern of the cutting edge, the shape shown having an edge 12 of irregular form such as might be required for some type of gasket.

The layout 10 is then wrapped around the periphery of a copy cylinder 14, as shown in FIG. 6, and is secured in place.

Figure 1:
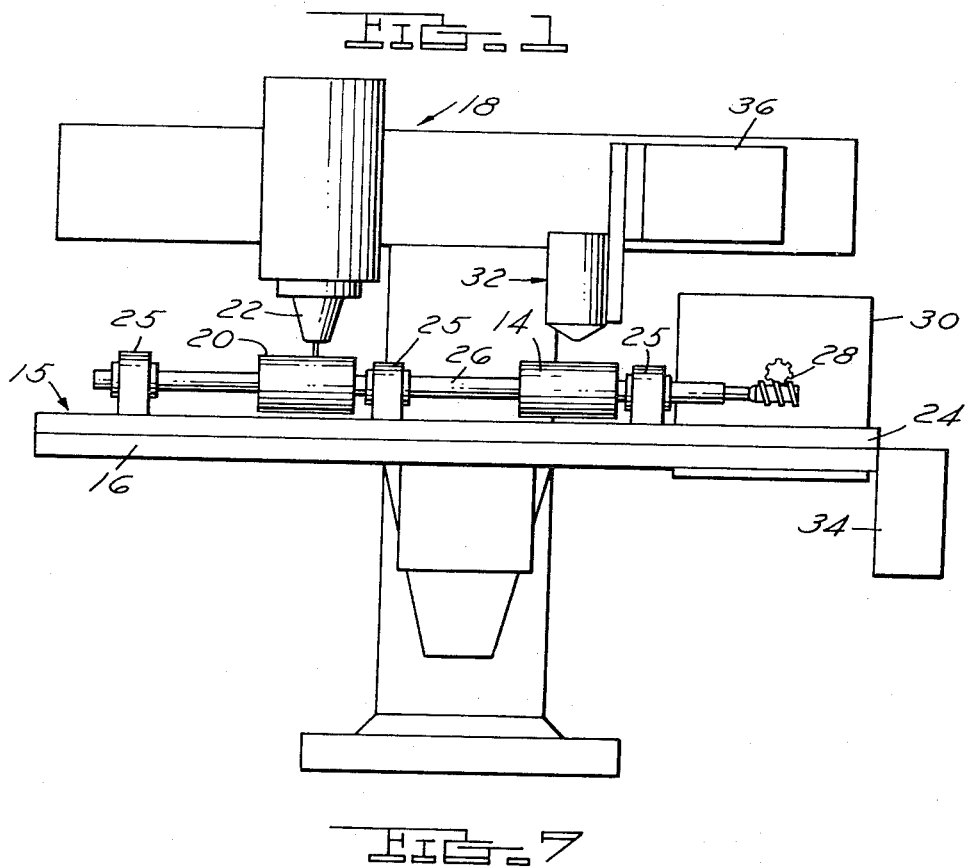
FIG. 1 is a schematic elevation of a milling machine for making a negative electrode cylinder from a line layout mounted on a copy cylinder.

This copy cylinder 14 is mounted on a fixture 15, FIG. 1, secured to the table 16 of a milling machine 18 together with a negative electrode cylinder 20, hereafter referred to simply as a "negative cylinder." This negative cylinder is the workpiece in this stage of the process, is made of carbon or other suitable electrode material, and is mounted under the spindle 22 of the machine. The fixture 15 includes a base member 24 supporting bearings 25 for a shaft 26 on which the copy and negative cylinders 14 and 20 are mounted; and, the shaft 26 is connected by gearing 28 to a motor 30 so as to be rotated thereby. The copy cylinder 14 is positioned beneath a tracing or scanning device 32 capable of sensing the configuration of the pattern 12 on the layout 10.

The motor 30 forms part of drive means for moving the copy and negative cylinders 14 and 20 relative to the scanning device and spindle 32 and 22 respectively, the other part of the drive means comprising a conventional table drive motor 34 which moves the machine table 16 linearly in a direction transverse to the axis of the spindle 22. In this arrangement the rotary movement of the cylinders 14 and 20 produced by the motor 30 and the linear movement of the table 16 produced by the motor 34 are coordinated as ordinate and abscissa, rotary movement corresponding to movement in the Y-axis and linear movement in the X-axis.

The scanning device 32, which is preferably a known optical type of unit, forms part of a drive control means 36 for synchronizing operation of the motors 30 and 34 to scan the pattern 12 and cause a grooved reproduction thereof to be machined on the peripheral surface of the negative cylinder 20, as illustrated by the grooves 12a in the sectional view of the cylinder 20, FIG. 4.

FIG. 2 illustrates a conventional type of EDM machine 40 having a head 42 and a tank 43. A fixture 44 is provided for mounting a formed negative cylinder 20 and a die blank cylinder 45 in axially parallel relation to each other. This fixture 44 has a member 46 suitably secured to the head 42 of the machine and carrying bearings 48 for a shaft 49 on which the negative cylinder 20 is placed for rotation therewith. A second member 50, mounted in the tank 43, carries bearings 52 for a shaft 53 on which the die blank cylinder 45 is placed; and, guide rods 54 secured to the member 50 slidably engage the head mounted member 46 to maintain the parallel relation between the shafts 53 and 49 as the member 46 is moved by the head of the machine during the EDM operation.

Drive means 56 rotate the shafts 49 and 53 and cylinders 20 and 45 mounted respectively thereon at equal rotational speeds, and include a support 58 on which a motor 59 and motor speed control unit 60 are mounted. As best shown in FIG. 3, a sprocket 62 on the output shaft 63 of the motor 59 drives a sprocket 64 secured to a shaft 65 and oppositely drives a sprocket 66 secured to a shaft 67 through a precision chain 68, properly tensioned by an idler sprocket 70. The shaft 49 on which the negative cylinder 20 is mounted is driven from the shaft 65 through a connecting shaft 72 and flexible couplings 73 and 74 of a known type which permit minimal rotational backlash, and a similar connecting shaft 76 and flexible couplings 77 and 78 drives the die blank cylinder shaft 53 from the drive shaft 67.

As the EDM machine 40 is operated, the negative cylinder 20 and die blank cylinder 45 are oppositely rotated at equal rotational speed by the motor 59 to machine a raised cutting pattern on the die blank cylinder 45 corresponding to the grooved reproduction on the negative cylinder 20, as shown by the cutting edges 12b formed on the cylinder 45, FIG. 4.

The negative cylinder 20 is preferably made of carbon, of relatively small grain, which results in fine detail in the EDM operation, and the formation of cutting edges 12b which are precise and sharp.

The die blank cylinder 45 is preferably completely hardened prior to the EDM machining operation, and has a cutting diameter which is less than the outside diameter of the negative cylinder 20 by a dimension at least two times the depth of the groove 12a formed therein. Actually the diameter of the negative cylinder 20 must be determined in accordance with the final diameter desired for the cylindrical die. For example, if the die 45 is to have a diameter at the cutting edge 12b of 4 inches and the depth of a cutting edge 12b is one-sixteenth inch, the negative cylinder 20 must have an outside diameter of at least 4.125 inches so that the diameter 20a of the negative cylinder at the root or base of the cutting configuration is equal to the cutting diameter 45a of the die cylinder. When such a die cylinder and negative cylinder are rotated at equal rotational speed in the EDM machining apparatus, the peripheral speeds of the root diameter of the negative cylinder and the cutting diameter of the die cylinder are equal.

Figure 7:
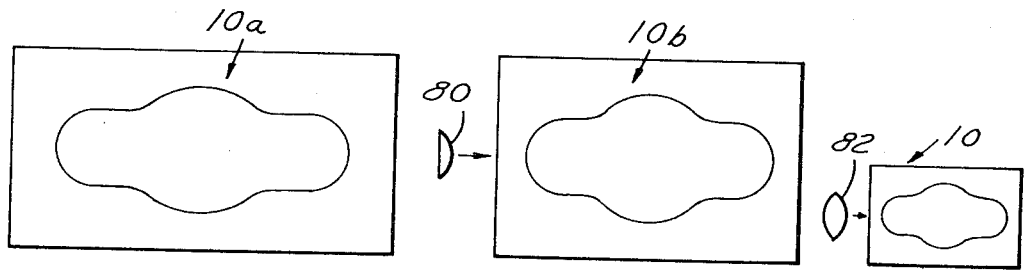

In the operation of machining the negative cylinder illustrated in FIG. 1, the copy cylinder 14 and negative cylinder 20 are shown as being of equal diameter. This may not always be the case. In some instances, it will be desirable to use a copy cylinder 14 of larger diameter than the negative cylinder 20 in order to obtain a mechanical pantograph effect for increased accuracy. It also may be desirable to adjust the scale of the layout 10 in order to use an existing copy cylinder rather than make a new one having the exact diameter required. FIG. 7 diagrammatically illustrates the steps which may be involved in making the master layout 10 shown in FIG. 5.

An original layout 10a is drawn, preferably on an enlarged scale in order to facilitate the drawing operation and to reduce the effect of any inaccuracies that may occur in this operation. If any adjustment in scale is necessary in order to compensate for the relative diameters of the copy cylinder 14 and negative cylinder 20, this is accomplished by photographically reducing the original layout 10a in one direction, using a cylindrical lens 80 to produce the enlarged layout 10b. By comparing FIGS. 6 and 7 it can be seen that the reduction in scale of the layout 10b is in the direction circumferentially of the copy cylinder 14, which direction corresponds to the Y-axis when the copy cylinder is mounted on the machine in the manner illustrated in FIG. 1. The last step is to reduce the layout 10b in both directions using a conventional photographic lens 82, to produce the master layout 10 which is mounted on the copy cylinder 14.

While the apparatus of the invention has been illustrated and described with relation to the manufacture of cylindrical cutting dies, it is obvious that the invention is applicable to the forming of other configurations on a cylindrical surface.

I claim:

1. Apparatus for performing a machining operation to form a cutting configuration on a die cylinder from a negative cylinder having an outside diameter and a negative reproduction of the cutting configuration formed therein and extending inwardly of the outside diameter to a root diameter, wherein the improvement comprises:
   the die cylinder having a cutting diameter which is less than the outside diameter of the negative cylinder by a dimension at least two times the depth of the cutting configuration formed therein;
   an electrical discharge machine having a tank and a head portion movable relative thereto;
   head mounted means and tank mounted means for rotatably supporting said cylinders in axially parallel relation during said relative movement between the head portion and the tank;
   and driving means for continuously rotating the cylinders in opposite directions at equal peripheral speeds of the root diameter of the negative cylinder and the cutting diameter of the die cylinder during the machining operation.

2. Apparatus as set forth in claim 1 wherein said driving means includes a motor, a drive shaft coupled to the negative cylinder, a second drive shaft coupled to the die cylinder, and a driving connection from the motor to each of said shafts, at least one of the drive shafts including a flexible coupling permitting relative movement between the cylinders in a direction perpendicular to the axes thereof.

3. Apparatus as set forth in claim 2 further including means for varying the speed of the motor.

4. Apparatus as set forth in claim 2 wherein the driving means further includes means for supporting the motor and a portion of each of the drive shafts in fixed spaced relation to each other, the driving connection including a cog wheel on said portion on each of the drive shafts.

5. Apparatus as set forth in claim 2 further including guide means between said head mounted means and tank mounted means for maintaining the electrode and die cylinders in axially parallel alignment.

* * * * *